United States Patent [19]
Kageyama

[11] Patent Number: 5,552,823
[45] Date of Patent: Sep. 3, 1996

[54] PICTURE PROCESSING APPARATUS WITH OBJECT TRACKING

[75] Inventor: Koji Kageyama, Kanagawa, Japan

[73] Assignee: Sony Corporation, Tokyo, Japan

[21] Appl. No.: 503,191

[22] Filed: Jul. 17, 1995

Related U.S. Application Data

[63] Continuation of Ser. No. 18,155, Feb. 16, 1993, abandoned.

[30] Foreign Application Priority Data

Feb. 15, 1992 [JP] Japan ................................. 4-061286
Feb. 17, 1992 [JP] Japan ................................. 4-061123
Feb. 25, 1992 [JP] Japan ................................. 4-073320

[51] Int. Cl.$^6$ ................................................... H04N 7/32
[52] U.S. Cl. ............................................ 348/155; 348/699
[58] Field of Search ............................ 348/155, 169, 348/699, 416, 405, 407; H04N 7/30, 7/32

[56] References Cited

U.S. PATENT DOCUMENTS

| | | | |
|---|---|---|---|
| 4,727,422 | 2/1988 | Hinman | 358/105 |
| 4,837,632 | 6/1989 | Kubo et al. | 348/208 |
| 4,924,310 | 5/1990 | von Brandt | 348/416 |
| 4,989,087 | 1/1991 | Pele et al. | 348/416 |
| 5,097,327 | 3/1992 | Hasebe | 358/105 |
| 5,103,305 | 4/1992 | Watanabe | 358/108 |
| 5,142,360 | 8/1992 | Niihara | 358/105 |
| 5,142,361 | 8/1992 | Tayama et al. | 358/105 |
| 5,148,269 | 9/1992 | de Haan et al. | 358/105 |
| 5,150,432 | 9/1992 | Ueno et al. | 358/136 |
| 5,177,794 | 1/1993 | Abe et al. | 358/105 |
| 5,194,908 | 3/1993 | Lougheed et al. | 358/105 |
| 5,196,688 | 3/1993 | Hesse et al. | 358/105 |
| 5,198,896 | 3/1993 | Kondo et al. | 358/105 |
| 5,200,820 | 4/1993 | Gharavi | 348/699 |
| 5,243,418 | 9/1993 | Kuno et al. | 358/108 |
| 5,251,028 | 10/1993 | Iu | 358/136 |
| 5,265,172 | 11/1993 | Markandey et al. | 348/148 |
| 5,396,437 | 3/1995 | Takahashi | 348/155 |
| 5,450,503 | 9/1995 | Ogino et al. | 348/169 |

FOREIGN PATENT DOCUMENTS

| | | | |
|---|---|---|---|
| 0079195 | 5/1983 | European Pat. Off. | H04N 5/34 |
| 0079195A3 | 5/1983 | European Pat. Off. | H04N 5/34 |
| 0180446 | 5/1986 | European Pat. Off. | H04N 9/64 |
| 00400998A2 | 12/1990 | European Pat. Off. | H04N 5/14 |

(List continued on next page.)

OTHER PUBLICATIONS

S.M.P.T.E. Journal, vol. 97, No. 11, Nov. 1988, White Plains, NY, U.S.A., pp. 908–910, "A New Technique to Improve Video Stability by Digital Processing" (Matsuzuru, et al.).

Vol. II Multidimensional Signal Processing, ICASSP 88, Apr. 11–14, 1988, New York, U.S.A., pp. 1088–1091, "Real-time Automatic Target Tracking Based on Spatio–Temporal Gradient Method with Generalized Least Square Estimation" (Kim et al.).

SMPTE Journal, vol. 97, NO. 11, Nov. 1988, pp. 908–910 (Matsuzuru et al.).

ICASSP 88–Multidimensional Signal Processing, vol. II, pp. 1088–1091, Apr. 11–14, 1988 (Kim et al.).

Patent Abstracts of Japan, vol. 14, No. 303, Jun. 29, 1990 (Kazunori).

*Primary Examiner*—Tommy P. Chin
*Assistant Examiner*—Vu Le
*Attorney, Agent, or Firm*—Jay H. Maioli

[57] ABSTRACT

In a picture processing apparatus such as a camera, monitor camera, television and the like, an imaging device is controlled to follow a desired target object and image it in the best state. A distribution of motion vectors within a tracking vector detection area is detected, and then the most characteristic motion vector is detected. In a second embodiment a power of components in a high frequency band is detected per unit of predetermined blocks, difference data between picture data of motion pictures of the present frame and the previous frame is obtained, the power of the difference data is detected per unit of predetermined blocks, and an edge having movement is detected on the basis of the detection result.

11 Claims, 11 Drawing Sheets

FOREIGN PATENT DOCUMENTS

| | | | |
|---|---|---|---|
| 0400998 | 12/1990 | European Pat. Off. | H04N 5/14 |
| 0424060A2 | 4/1991 | European Pat. Off. | H04N 7/30 |
| 0458373A2 | 11/1991 | European Pat. Off. | H04N 5/232 |
| 0458373 | 11/1991 | European Pat. Off. | H04N 5/232 |
| 0520741A1 | 12/1992 | European Pat. Off. | H04N 5/232 |
| 0541302A2 | 5/1993 | European Pat. Off. | H04N 7/24 |
| 2096681 | 6/1990 | Japan | G01S 3/786 |
| 2242590 | 10/1991 | United Kingdom | G01S 3/78 |

PICTURE PROCESSING APPARATUS WITH OBJECT TRACKING

This is a continuation of application Ser. No. 08/018,155 filed Feb. 16, 1993 now abandoned.

FIELD OF THE INVENTION

This invention relates to a picture processing apparatus, and is applicable to an imaging device, for example, a television camera, a monitor camera, and a television conference system, besides a picture data transmitting system, which carries out compensation for the motion of picture data, and the like.

BACKGROUND OF THE INVENTION

Conventionally, as an apparatus for following an object to be imaged, a picture processing apparatus was proposed for following a targeted portion of a picture, by detecting the brightest region in an image picked up, on the basis of which the desired target portion is followed.

If any desired portion of an image can be tracked in such a way, then automatic focusing, iris adjustment and the like can be performed for this portion of the image to be able to achieve the improvement of the easy use of imaging devices.

However, there is a problem that the apparatus in which a desired portion of an image is tracked based on the brightest region in the image, can not follow a target portion of the image reliably, thereby being insufficient to use practically.

One method for solving this problem is to follow the target portion of an image on the basis of a picture characteristic thereof. However, this method has a disadvantage that a generally complicated structure is required for the apparatus.

A further method for solving this problem is to detect motion of a target portion of an image, by detecting a power of difference data obtained from a difference between frames, but in some cases, a detected result which is different from the motion of the target portion of an image may be obtained.

Another proposed method is to detect motion of a target portion of a picture, by using a time spatial filter apparatus. However, in this method, an amount of operation is large, therefore, this method has a disadvantage that a generally complicated structure is required for the apparatus.

On the other hand, conventionally, a method for transmitting a motion picture with high efficiency is proposed.

More specifically, in such a picture conversion apparatus, picture data sequentially inputted are divided into predetermined unit blocks, and then a motion vector is detected for every block, by using the block matching method.

Then, residual data is generated by subtracting picture data sequentially motion compensated for each block of picture data, after motion compensating picture data which is for one frame, on the basis of said detected result.

Thus, the amount of picture data is previously reduced, as compared to a case in which picture data is directly transmitted by using correlation between frames of motion picture.

This residual data is sequentially processed with discrete cosine transform and variable length coding, and is stored into a buffer memory after re-quantizing said residual data.

Thus, the picture data stored in the buffer memory are sequentially outputted from it at predetermined timing, and picture data is outputted keeping the amount of data at a constant value by changing a quantization step size of the re-quantizer, corresponding to a residual quantity of said buffer memory.

Thus, the motion picture can be transmitted with high efficiency, by using correlation of between frames of a motion picture.

Now, in the motion picture, a part of large motion has a characteristic that deterioration of picture quality is imperceptible.

Further, in such a motion picture, having a case where part of a picture has pronounced changes as compared with changes of thus around picture, another case of changes to the whole of a picture occurs.

In this case of a motion picture, it has a characteristic that deterioration of picture quality is more imperceptible, comparing to a case where the whole of a picture has constant motion.

With effectively using this unique characteristic, it is expected that more efficient transmission of motion pictures can be achieved. It is also expected that the quality of motion picture can be improved compared to the conventional technology.

SUMMARY OF THE INVENTION

In view of the foregoing, an object of this invention is to provide a picture processing apparatus, for example, a television camera, monitor camera, television conference system and the like, which controls an imaging device to take a picture into the best condition by tracking a target portion of a picture. Further, in the thus obtained picture, a high quality motion picture is to be transmitted with high efficiency, by making effective use of human visual sensitivity.

A target object following apparatus for following a portion of a picture, comprises: an input circuit for setting a tracking vector detection region to a motion picture inputted from an imaging device;

- a tracking vector detection circuit for detecting a motion direction and motion distance of a picture in the tracking vector detection region, about a picture in the tracking vector detection region which is set by said input circuit;
- a window-frame data generation circuit for designating an area followed by said tracking vector detection circuit by use of a window frame, and for generating a control signal which is always caught on a target portion of a picture;
- a picture composing circuit for composing a motion picture inputted from said imaging device with said window frame; and
- a camera driving circuit for driving said imaging device, by controlling a signal generated from said window-frame data generation circuit: wherein
  the output of the picture composing circuit is displayed on a picture displaying device to be able to observe a state of following the target object, and to control the imaging device to be able to catch the target object always in the best state.

The tracking vector detection circuit can track the target portion of a picture, by detecting a distribution of motion vectors in said tracking vector detection region, and can track a target portion of a picture by using spatial edges and time edges.

On the other hand, a picture conversion apparatus for performing transmission of said high quality motion picture, comprises:

- a motion detection circuit for detecting a motion vector for each block, after dividing picture data inputted from an imaging device into a predetermined number of unit blocks;
- a picture data processing apparatus for outputting a residual data after motion compensating picture data on the basis of a motion vector;
- a motion field detection circuit for detecting disorder of a motion vector about a block of residual data and adjacent blocks in surrounding regions;
- a re-quantization circuit for outputting quantization data for quantizing the residual data; and
- a buffer circuit for storing quantization data and outputting thereof: wherein
  - when the motion vector is in disorder, the requantization circuit quantizes the residual data, after changing the quantization step size in a large way, on the basis of the detection result from the motion field detection circuit.

With the above construction of the present invention, is possible to detect a movement direction and movement distance of a target portion of a picture with simple construction, and this can be achieved by making effective use of human visual sensitivity so as to transmit the picture signal with high picture quality.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
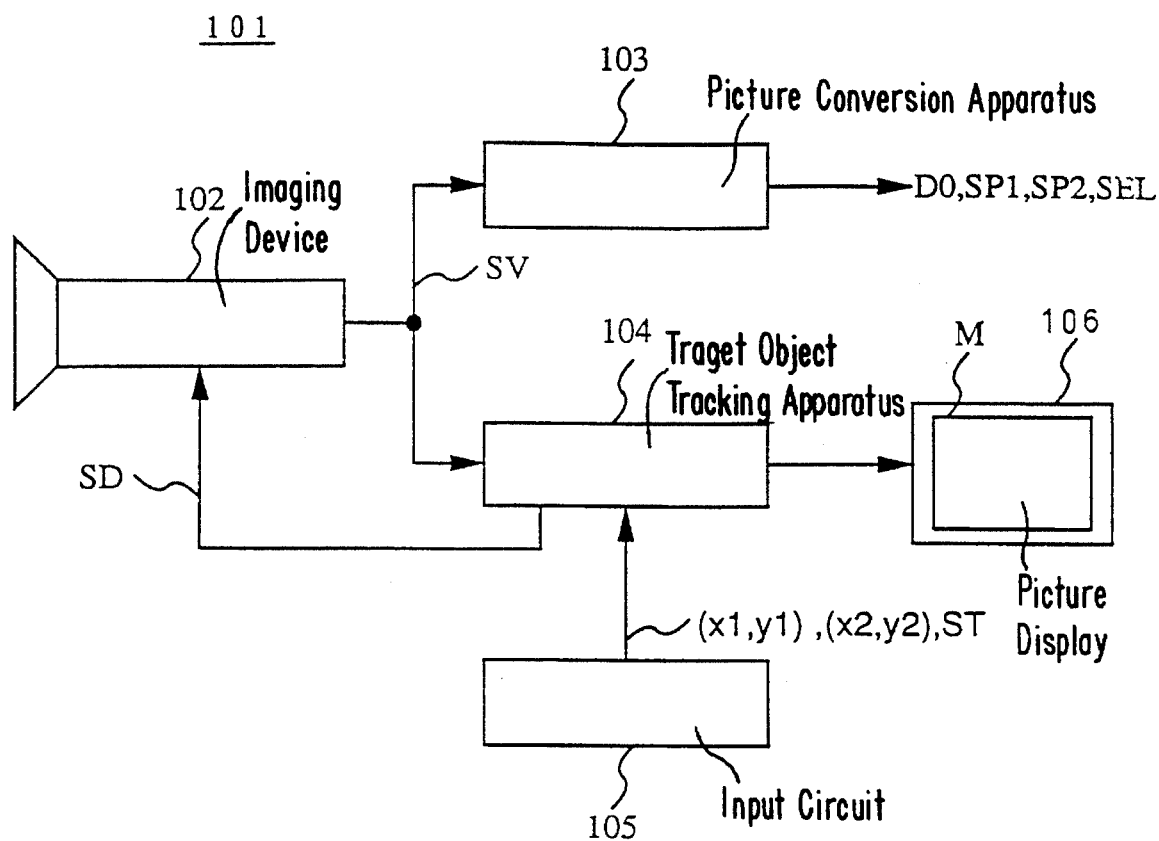
FIG. 1 is a block diagram showing a picture processing apparatus according to the present invention.

Preferred embodiments of this invention will be described with reference to the accompanying drawings:

(1) General Construction of The Picture Processing Apparatus In The Present Invention In FIG. 1, 101 designates a general construction of a picture processing apparatus in the present invention.

Video signal SV imaged by an imaging device 102 is transmitted to a picture conversion apparatus 103 and to a target object tracking apparatus 104.

An input circuit 105 sets a position of a target portion of a picture by use of a frame, and outputs coordinate data showing this tracking vector detection region (x1, y1) (x2, y2) and a trigger signal ST which commands tracking execution.

In the target object tracking apparatus 104, a target portion of a picture selected by the input circuit 105 is tracked, as thus the tracking state, a picture having a shape of a window frame which catches the target portion of a picture is composed with video signal SV, then the composite picture M is displayed on a picture display 106.

In this way, the video signal SV imaged into the best condition by imaging device 102, is displays to effectively process the picture signal by use of human visual characteristic in a picture conversion apparatus 103, thereby output picture signals D0, SP1, SP2 and SEL are transmitted.

Figure 2:
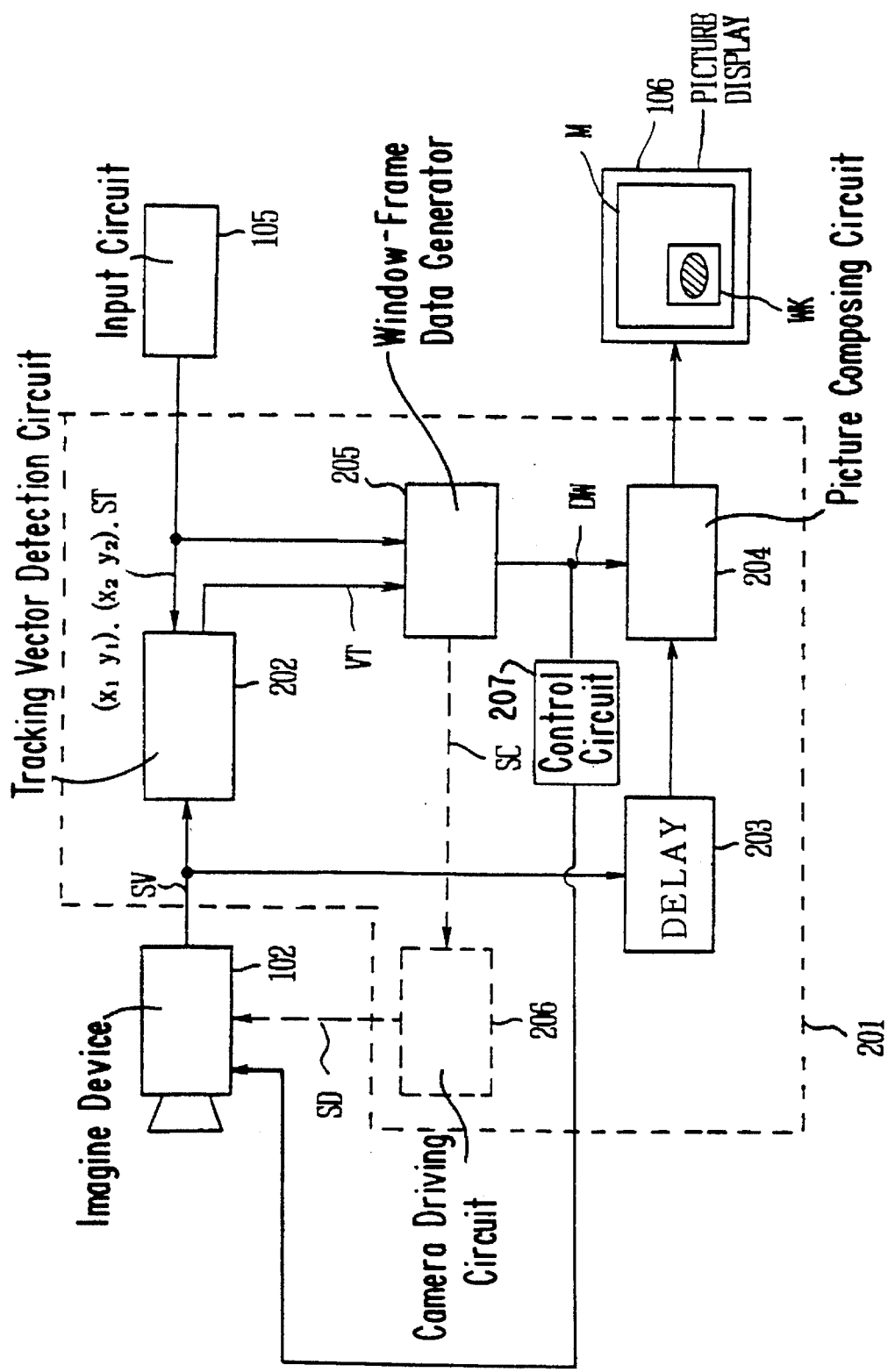
FIG. 2 is a block diagram showing first and second embodiments of a target object following apparatus.

(2) First Embodiment of the Object Tracking Apparatus (2-1) General Construction In FIG. 2, 201 designates the target object tracking device for tracking a picture of a subject specified by a user to adjust an iris and focus.

That is, an imaging device-102 images a picture of a desired target object in a field of vision and then outputs a resultant video signal SV of the picture to a tracking vector detection circuit 202.

The tracking vector detection circuit 202 converts successively input video signals SV into digital signals and sets a tracking vector detection region AR, based on coordinate data (x1, y1) and (x2, Y2) input from an input circuit 105.

Furthermore, when a trigger signal ST is input from the input circuit 105, the tracking vector detection circuit 202 detects a tracking vector VT which represents a motion direction and motion distance of the target object of a portion of a picture existing in the tracking vector detection region AR, and furthermore outputs the detection result to a window-frame data generator 205.

When the tracking vector VT is obtained, the tracking-vector detection circuit 202 shifts the tracking vector detection region AR by the amount corresponding to the tracking vector VT. Then, the tracking vector detection circuit 202 repeats the detection of the tracking vector VT for the subsequent frame using the tracking vector detection region AR which has been shifted.

In this way, tracking-vector detection circuit 202 detects a motion direction and motion distance of a picture in the tracking vector detection region AR and also shifts the tracking vector detection region AR to follow the motion of the picture.

In the target object tracking device 201, the input circuit 105 is operated for inputting coordinate data with a joystick so that the tracking-vector detection region AR is set by operation with the joystick.

Figure 3:
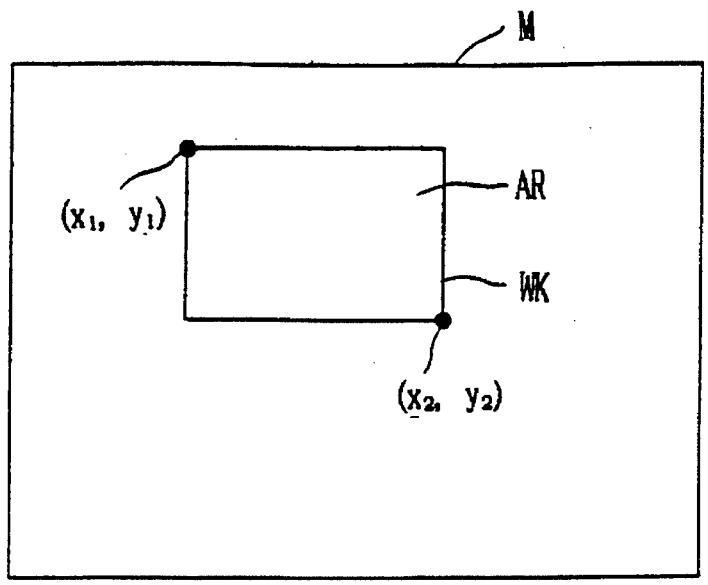
FIG. 3 is a schematic diagram illustrating a description of setting of a tracking vector detection region, in the first and second embodiments of the target object tracking apparatus.

In the target object tracking device 201, the video signal SV is applied to a picture composing circuit 204, whereas a picture having a shape of a window frame (hereafter referred to as a window-frame picture) WK is generated based on a window-frame data DW given from the window-frame data generator 205 as shown in FIG. 3.

Moreover, in the target object tracking device 201, the window-frame picture WK is superimposed on the video signal SV by the picture composing circuit 204, then the resultant composite picture M is displayed on a picture display 106.

In the above process, based on the coordinate data (x1, y1) and (x2, y2) input from the input circuit 105, the window-frame data generator 205 generates window-frame data DW corresponding to the tracking-vector detection region AR so that the window-frame picture WK represents the tracking-vector detection region AR.

In this way, in the target object tracking device 201, a tracking-vector detection region AR can be set easily only by operating a joystick while monitoring a picture display 106.

In this preferred embodiment, a window-frame picture WK of predetermined size is displayed at the central position of the screen in the initial state. Then, a user can change the position and size of the window-frame picture WK by operating the joystick and monitoring the displayed picture to set the desired tracking-vector detection region AR.

In this setting operation, the tracking-vector detection region AR is set to a size including an certain integer number of unit blocks for detecting a motion vector so that a tracking vector can be detected easily based on the detection result of the motion vector.

Moreover when a starting button for starting the tracking operation is pressed, the input circuit 105 outputs a trigger signal ST for starting the tracking operation, whereas when an ending button for ending the tracking operation is pressed, the input circuit 105 outputs a control signal for ending the tracking operation. In this way, operation is controlled overall for the target object tracking device 201.

Figure 4:
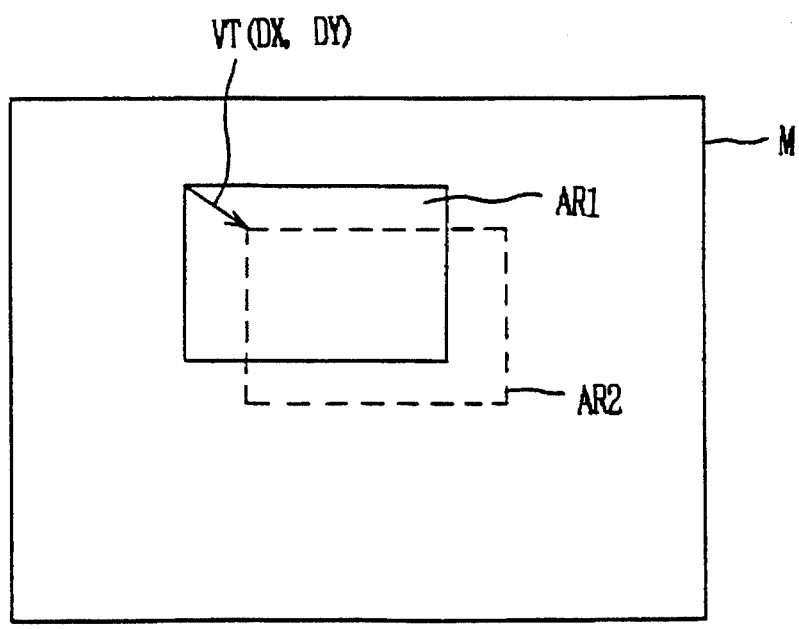
FIG. 4 is a schematic diagram illustrating a description of a frame display position, in the first and second embodiments of the target object tracking apparatus.

As shown in FIG. 4, when a tracking vector VT (DX, DY) is obtained, the window-frame data generator 205 adds two-dimensional coordinate components DX, DY to the coordinates (x1, y1) and (x2, y2) of the window-frame data DW and outputs the result.

Thus, based on the tracking vector VT, the window-frame data generator 205 updates the window-frame data DW so that the window-frame picture WK is moved to follow the motion of a picture in the tracking-vector detection region.

Furthermore, in this embodiment, the window-frame data generator 205 outputs the window-frame data DW to a control circuit (207), then this control circuit 207 detects a signal level of the video signal SV in the region which is defined by the window-frame data DW (that is, the tracking-vector detection region AR). Based on the detection result, the control circuit 207 controls the focus and the iris of the imaging device 102.

In this way, in the target object tracking device 201, the motion of the targeted picture in the tracking-vector detection region AR which is set by a user is tracked so that the optimum brightness and focus are always maintained for the targeted picture.

(2-2) Tracking-Vector Detection Circuit

Figure 5:
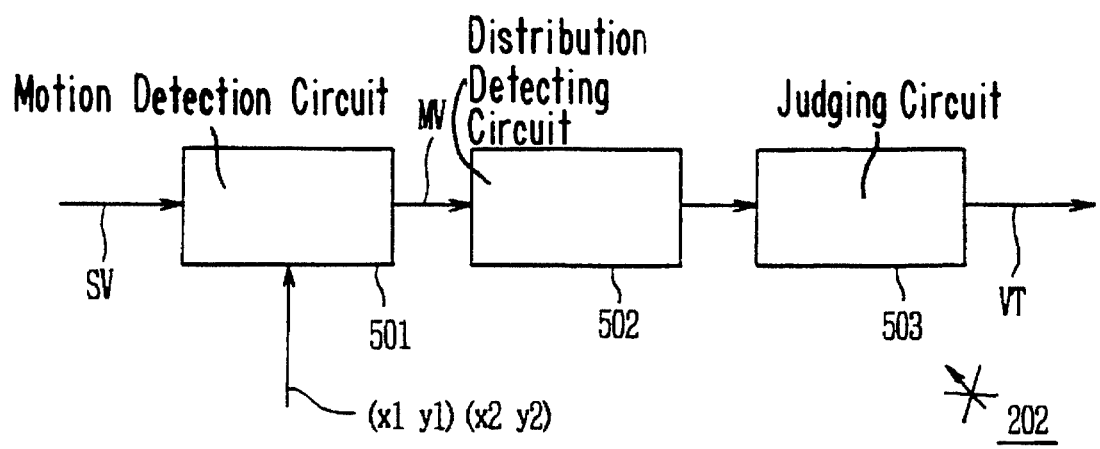
FIG. 5 is a block diagram showing a tracking vector detection circuit, in the first and second embodiments of the target object tracking apparatus.

As shown in FIG. 5, the tracking-vector detection circuit 202 gives the video signal SV to the motion detection circuit 501, by which the motion vector MV is detected.

Figure 6:
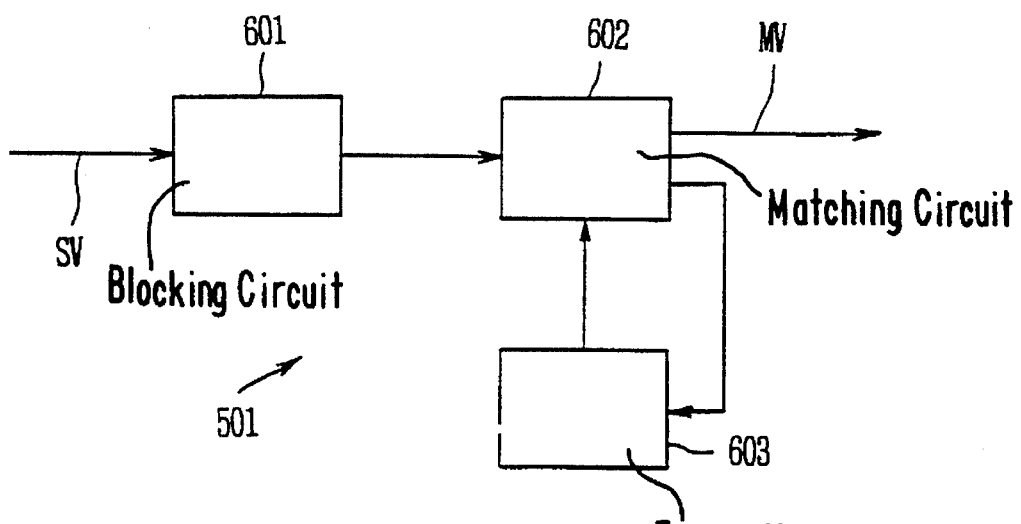
FIG. 6 is a block diagram showing a motion detection circuit, in the first embodiment of the target object tracking apparatus.

Then, as shown in FIG. 6, the motion vector detection circuit 501 gives the video signal SV to the blocking circuit 601. The motion vector detection circuit 501 converts this video signal SV into a digital signal (hereafter, referred to as a digital video signal).

Figure 7:
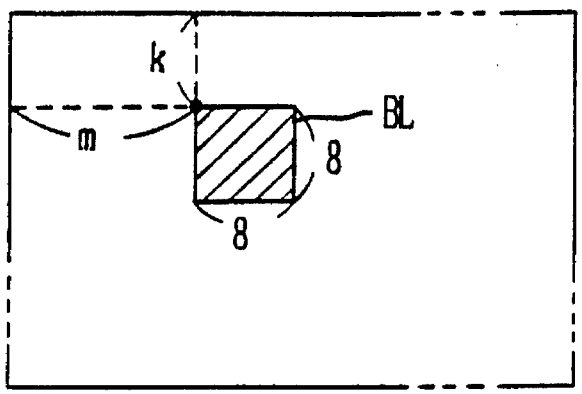
FIG. 7 is a schematic diagram illustrating a description of a blocking circuit, in the first and second embodiments of the target object tracking apparatus.

Furthermore, as shown in FIG. 7, the blocking circuit 601 divides the digital video signal into blocks BL each of which contains 8×8 pixels, then outputs the digital video signal for every block according to the order of raster scanning (FIG. 7 shows a block located at (m, k) pixel position).

A matching circuit 602 obtains the motion vector MV for every block by adapting the block matching method to the result of comparison between the output signal from the blocking circuit 601 and the output signal from a frame memory 603.

Figure 8:
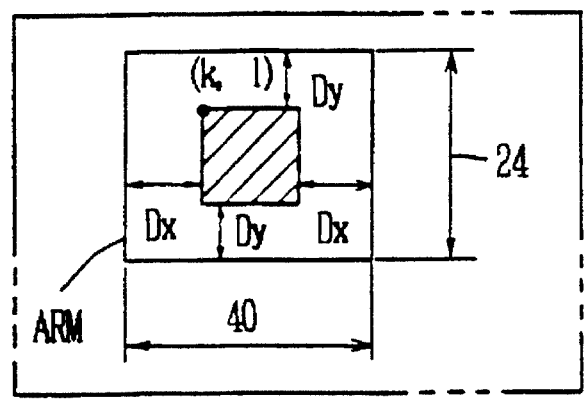
FIG. 8 is a schematic diagram illustrating a description of detecting of a motion vector, in the first embodiment of the target object tracking apparatus.

That is, as shown in FIG. 8, the matching circuit 602 assigns a region which is wider than a block by 2Dx×2Dy in horizontal and vertical directions respectively for a motion-vector detection region ARM for every block. Then, the matching circuit 602 detects the difference between the present picture data in a block and the one-frame-previous data in the motion-vector detection region ARM, wherein the one-frame-previous data is stored in the frame memory 603.

During the above process, the matching circuit 602 changes successively the location of the block BL within the motion-vector detection region ARM, and determines the location where the sum of the absolute values of the above differences is minimized.

In this way, the matching circuit 602 detects the motion vector MV for every block BL, and then outputs the detected result to a distribution detecting circuit 502.

The distribution detecting circuit 502 detects the distribution of the motion vector MV in the tracking-vector detection region AR with respect to direction and magnitude. The detected result is output to a judging circuit 503.

More specifically, the distribution detecting circuit 502 has a table having a size of 2DX×2DY corresponding to the motion vector detection region ARM. The contents of the table are initialized and set to 0 at the beginning of every frame. The distribution detecting circuit 502 updates the contents of the table one at a time depending on the value of the motion vector MV. Thus, the distribution of the motion vector MV is detected based on the motion-vector detection region ARM.

Furthermore, the distribution detecting circuit 502 updates the tracking-vector detection region AR, based on the detection result with respect to the tracking vector given by the judging circuit 503. Thus, while the distribution detecting circuit 502 updates the tracking-vector detection region AR for every frame to track the motion of the picture, it detects the distribution of the motion vector in the updated tracking-vector detection region AR.

Based on the result of the detected distribution, the judging circuit 503 sets a motion vector MV having the biggest count in the distribution as the tracking vector VT, then outputs this tracking vector.

A motion vector MV showing the most dominant motion among the motion vectors within a frame which is set to surround the target object can be considered to represent the direction and magnitude of the motion of the target object.

Therefore, by detecting the most dominant motion vector, the desired target object can be tracked with a simple construction of apparatus. This tracking capability can be effectively used for automatic focusing and automatic adjustment of an iris. Thus, easier operation is achieved for the target object tracking apparatus 201.

(2-3) Operation of an Embodiment

In the above construction, the output video signal SV from the imaging device 102 is applied to the tracking-vector detection circuit 202. Then, after converting the video signal into the digital signal, the blocking circuit 601 divides the digital video signal into blocks consisting of 8×8 pixels.

For each of these blocks, the motion vector MV is detected by the matching circuit 602.

This motion vector MV is applied to the distribution detecting circuit 502, by which the distribution of the motion vector MV in the tracking-vector detection region AR is detected and a motion vector MV showing the most dominant motion is set as the tracking vector VT.

As described above, the distribution of the motion vector is obtained and the most dominant motion vector MV is set as the tracking vector VT, thus the motion of the target object can be tracked with a simple construction.

The detection result of the tracking vector is applied to the window-frame data generator 205, by which the window-frame data DW is updated based on the tracking vector VT so that the window-frame picture WK is moved on the screen of the display 106 following the motion of the picture.

Moreover, by detecting the signal level of the video signal SV in the region defined by the window-frame data DW, it is possible to control the focus and the iris of the imaging device 102, following the motion of the target object.

Furthermore, the detection result of the tracking vector is applied to the distribution detecting circuit 502, by which the tracking vector is detected for the subsequent frame. In this way, the tracking vector can be detected for successive frames.

(2-4) Other Embodiments

In the above embodiment, the focusing and the iris are adjusted based on the detection result of the tracking vector. However, the present invention is not limited to that. A zooming operation or the like can be also performed in addition to that.

Furthermore, instead of moving the window frame, a similar operation can be achieved by outputting the control signal SC to the camera driving circuit 206 (FIG. 2) to change the picture sensing region following the motion of the target object. In this case, a combination of the motion of the window frame and a change of the picture sensing region is also possible to adapt to the motion velocity.

In the above embodiment, the contents of the table are updated directly from the detection result of the motion vector to detect the tracking vector. However, the present invention is not limited to that. After re-quantization of the motion vector, a similar operation can be also achieved.

In this case, when the accuracy of the tracking vector is not good enough, the size of the table can be reduced. Thus, it becomes possible to detect the motion of the target object with a simpler construction.

Furthermore, in the above embodiment, after detecting the motion vector MV for every block BL, the distribution of the motion vector MV in the tracking-vector detection region AR is detected. However, the present invention is not limited to that. Similar effect can be also achieved for the case where the distribution is detected after the motion vector MV is detected only within one block in the tracking vector detection region.

(3) Second Embodiment of The Target Object Tracking Device (3-1) General Construction A second embodiment of the targeted-object tracking apparatus, as described above in FIG. 2, has an entire construction the same as the first embodiment of said target object tracking apparatus.

(3-2) Tracking-Vector Detection Circuit

The tracking-vector detection circuit 202 detects motion edges from the video signal SV, then based on this detection result detects the tracking vector VT.

Figure 9:
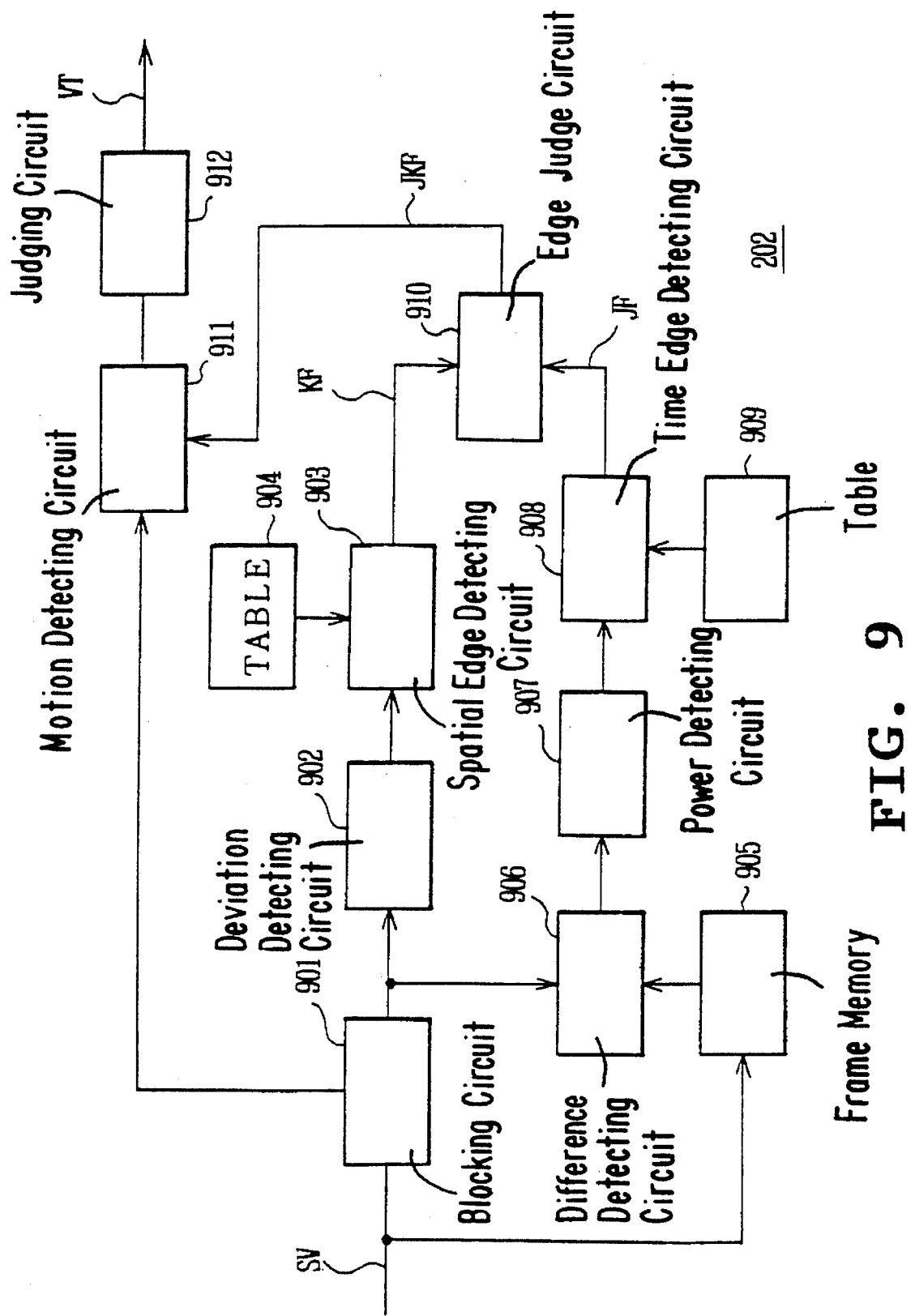
FIG. 9 is a block diagram showing a tracking vector detection circuit, in the second embodiment of the target object tracking apparatus.

That is, as shown in FIG. 9, in the tracking-vector detection circuit 202, the successively input video signal SV is converted into a digital signal to generate picture data, and then this picture data is applied to a blocking circuit 901.

The blocking circuit 901 successively outputs the above picture data, according to the order of raster scanning, together with the picture data with regard to eight pixels surrounding the present picture data.

In this way, the blocking circuit 901 divides the successively input video signal SV into unit blocks containing 3×3 pixels, then successively outputs the video signal block by block.

A deviation detecting circuit 902 determines the average value with respect to the output data from the blocking circuit 901, then generates the deviation data by subtracting each output data from the above obtained average value.

Thus, the deviation detecting circuit extracts high frequency components block by block and outputs the results.

Furthermore, the deviation detecting circuit 902 determines the sum of the absolute values of the deviation data to determined the sum of the absolute values of the deviations for each block. Thus, the high frequency component power is determined block by block.

A spatial edge detecting circuit 903 compares the power detected by the deviation detecting circuit 902 with a predetermined threshold stored in a table 904 and sets a spatial edge detection flag KF when the high frequency component power becomes larger than the threshold.

That is, when there exist edges, a large value of the deviation data is obtained for each corresponding block.

Therefore, as in this specific embodiment, if the high frequency component power is detected for each block, then it becomes possible to detect the existence of an edge, based on the power detection result.

In this way, in the tracking-vector detection circuit 202, the high frequency component power is detected for predetermined blocks to detect edges in the two-dimensional space of a motion picture.

A frame memory 905 stores and outputs one frame of digitized video signal SV. Thus, the frame memory 905 can output picture data which is one-frame previous to the frame of the output data of the blocking circuit 901 (hereafter, the data in the frame memory will be referred to as a previous frame data and the output data of the blocking circuit 901 will be referred to as a current frame data).

In the above processing, the frame memory 905 successively outputs the picture data corresponding to the blocking circuit 901, together with the data of eight pixels surrounding the current pixel, according to the order of the raster scanning.

Thus, the frame memory 905 successively outputs the previous frame data, corresponding to the output data of the blocking circuit 901, block by block wherein one block consists of 3×3 pixels.

A difference detecting circuit 906 obtains the difference data by subtracting the output data of the frame memory 905 from the corresponding output data of the blocking circuit 901. Thus, the difference detecting circuit 906 successively outputs the difference data for each 3×3 pixel block.

A power detecting circuit 907 detects the power of the difference data by detecting the sum of the absolute values of the difference data, and then outputs the obtained result.

A time edge detecting circuit 908 compares the power detected by the power detecting circuit 907 with a predetermined threshold stored in a table 909 and sets a time edge detection flag JF when the power of the difference data exceeds the threshold.

That is, when change occurs in a picture, a large value is obtained in the difference data between the current frame and the previous frame.

Obtaining the difference data between the current frame and the previous frame implies extracting of high frequency components along the time axis. This means that edge components are extracted with respect to the time axis.

That is, if the power of the difference data is detected for each small block consisting of 3×3 pixels, then, based on this detection result, it is possible to detect edges along the time axis, that is, an abrupt change in a picture as in the case where an edge moves in the two-dimensional space.

Based on the edge detection principle described above, an edge judging circuit 910 sets a motion edge detection flag JKF when the spatial edge detection flag KF and the time edge detection flag JF are set. Thus, the edge judging circuit 910 detects a motion edge and outputs the detected result.

In this way, edges are detected with respect to both time and space using a small block as a detection unit. Based on this detection result, motion edges are detected. Thus, it is possible to easily make reliable detection of motion edges.

As shown in FIG. 7, a motion detecting circuit 911 divides a digital video signal into blocks BL wherein each of block consists of 8×8 pixels (FIG. 7 shows a block located at the position (k×m)), and then detects the motion vector a MV for each block by using the block matching method.

That is, the motion detecting circuit 911 detects the residual difference in the data between the previous frame and the current frame for each block, then further determines the sum of the absolute values of the above resultant residual difference data.

In this processing, the motion detecting circuit 911 successively shifts the position of each block within a predetermined motion vector detection region to detect the position where the above sum of the residual difference data is minimized. Thus, the motion vector is detected.

In the above processing, the motion detection circuit 911 selectively performs the above motion vector detection processing only for blocks whose corresponding motion-edge detection flag JKF is set in the tracking-vector detection region AR.

The selective detection of the motion vector only for the blocks in the tracking-vector detection region AR leads to reduction in the amount of calculation compared to the case where the motion vector is detected for all blocks.

Furthermore, by detecting the motion vector only for the blocks whose corresponding motion-edge detection flag JFK is set, it is possible to selectively detect only the motion vectors reflecting the motion of the target object. Thus, the detection accuracy can be improved. Besides, the amount of calculation can be also reduced.

A judging circuit 912 detects the distribution of the motion vector, based on the direction and magnitude of the motion vector. Then, the judging circuit 912 detects the tracking vector VT, based on the detection result of the above distribution.

That is, the judging circuit 912 has a table having a size of 2Dx×2Dy corresponding to the motion-vector detection region. The contents of this table are initialized and set to "0" at the beginning of every frame. The judging circuit 912 adds unit value, "1", one at a time, to the contents of the table depending on the value of the motion vector MV. Thus, the distribution of the motion vector is detected with respect to the motion-vector detection region.

Based on the result of the detected distribution, the judging circuit 912 sets a motion vector MV having the biggest count in the distribution as the tracking vector VT, and then outputs this tracking vector.

A motion vector MV showing the most dominant motion among the motion vectors within a window frame which is set to surround the target object can be considered to represent the direction and magnitude of the motion of the target object.

Therefore, by detecting the most dominant motion vector, the desired target picture can be tracked with a simple construction of apparatus. This tracking capability can be effectively used for automatic focusing and automatic adjustment of an iris. Thus, an easier operation is achieved for the target object tracking apparatus.

Furthermore, the judging circuit 912 updates the tracking-vector detection region AR, based on the result of the tracking vector detection. Thus, while updating the tracking-vector detection region AR for every frame to follow the motion of the picture, the judging circuit 912 detects the distribution of the motion vector in the updated tracking-vector detection region AR.

(3-3) Operation of an Embodiment

In the above construction, the output video signal SV from the imaging device 102 is successively applied to the deviation detecting circuit 902 by unit of 3×3 pixels via the blocking circuit 901. The deviation detecting circuit 902 determines the deviation of the given data from the average value.

Furthermore, the sum of the absolute values of the above deviation data is determined. Thus, the high frequency component power is successively detected in the order of raster scanning for the current pixel with respect to the eight pixels surrounding the current pixel. In the spatial edge detecting circuit 903, the above detected power is compared with a predetermined threshold and a spatial edge detection flag KF is set when an edge is observed in the two-dimensional space.

Furthermore, the difference detecting circuit 906 determines the difference between the output data of the blocking circuit 901 and the picture data of the previous frame. Then, the power detecting circuit 907 detects the power of the above difference data.

In the time edge detecting circuit 908, this resultant power is compared with the predetermined threshold value. When there is observed an edge along the time axis, that is, an abrupt change in an picture as in the case where an picture moves on the two-dimensional space, the time edge detection flag JF is set.

The spatial edge detection flag KF and the time edge detection flag JF are applied to the edge judging circuit 910. The edge judging circuit 910 sets the motion-edge detection flag JKF when both flags KF and JF are set. Thus, the motion edge can be detected.

The motion edge detection flag JKF is applied to the motion detecting circuit 911, where the motion vector is detected based on the motion-edge detection flag JKF.

That is, in the motion detecting circuit 911, the video signal is divided into blocks each of which consists of 8×8 pixels, and then the motion vector is detected for the blocks whose corresponding motion-edge detection flag JKF is set in the tracking-vector detection region.

The motion vector MV is applied to the judging circuit 912. The judging circuit 912 detects the distribution of the motion vector and sets a motion vector having the largest count in the distribution as a tracking vector VT.

This tracking vector VT is applied to the window-frame data generator 205. Then, the window-frame data generator 205 updates the window-frame data according to the tracking vector VT so that the window-frame picture WK is moved on the screen of the display 106 following the motion of the target object.

Furthermore, by detecting the signal level of the video signal in the region defined by the window-frame data DW, it is possible to control the focus and the iris of the imaging device 102 following the motion of the target object.

(3-4) Other Embodiments

In the above embodiment, the power is detected for a region consisting of 3×3 pixels to detect the edge. However, the present invention is not limited to that. The detection region can be set in a broad range as required.

Furthermore, in the above embodiment, in addition to the picture data which is output according to the order of raster scanning, the picture data of eight pixels surrounding the above picture data is also output so that the picture data processing is successively carried out for each unit of data consisting of 3×3 pixels. However, the present invention is not limited to that. For example, it is also possible to divide the motion picture into units consisting of 3×3 pixels for the processing.

In the above embodiment, the power of the difference data is detected by determining the sum of the absolute values of the difference data. However, the present invention is not limited to that. As in the case of the deviation data, the power of the difference data can be also obtained by calculating the sum of the absolute values of the deviation from the average value.

Furthermore, in the above embodiment, the power of each data is determined from the sum of the absolute values. However, the present invention is not limited to that. The high frequency component power can be also determined from the sum of squares.

In the above embodiment, the focusing and the iris are adjusted based on the detection result of the tracking vector. However, the present invention is not limited to that. A zooming operation or the like can be also performed in addition to that.

Furthermore, instead of moving the window frame, a similar operation can be achieved by outputting the control signal SC to the camera driving circuit 206 (FIG. 2) to change the picture sensing region following the motion of the target object. In this case, the combination of the motion of the window frame and a change of the picture sensing region is also possible to adapt to the motion velocity.

In the above embodiment, to detect the tracking vector, the contents of the table are updated directly from the detected result of the motion vector. However, the present invention is not limited to that. A similar effect can be obtained by re-quantizing the motion vector.

In this case, when the accuracy of the motion vector is not good enough, the size of the table can be reduced. Thus, the detection of the motion of the target object can be achieved by a simpler construction.

Furthermore, in the above embodiment, the motion vector is detected only for the blocks whose corresponding motion-edge detection flag is set in the tracking-vector detection region. However, the present invention is not limited to that. The motion vector can be also determined by selectively detecting the distribution after detecting the motion vector for all blocks.

Alternatively, in the above processing, the motion-edge detection flag may be counted for every block and the distribution of the motion vector may be detected only for the blocks having a count larger than a predetermined number.

Furthermore, in the above embodiment, the target object is tracked by detecting the tracking vector. However, the present invention is not limited to that. The present invention can be preferably applied to various picture processing systems in which a motion picture is processed by detecting the motion edge.

Figure 10:
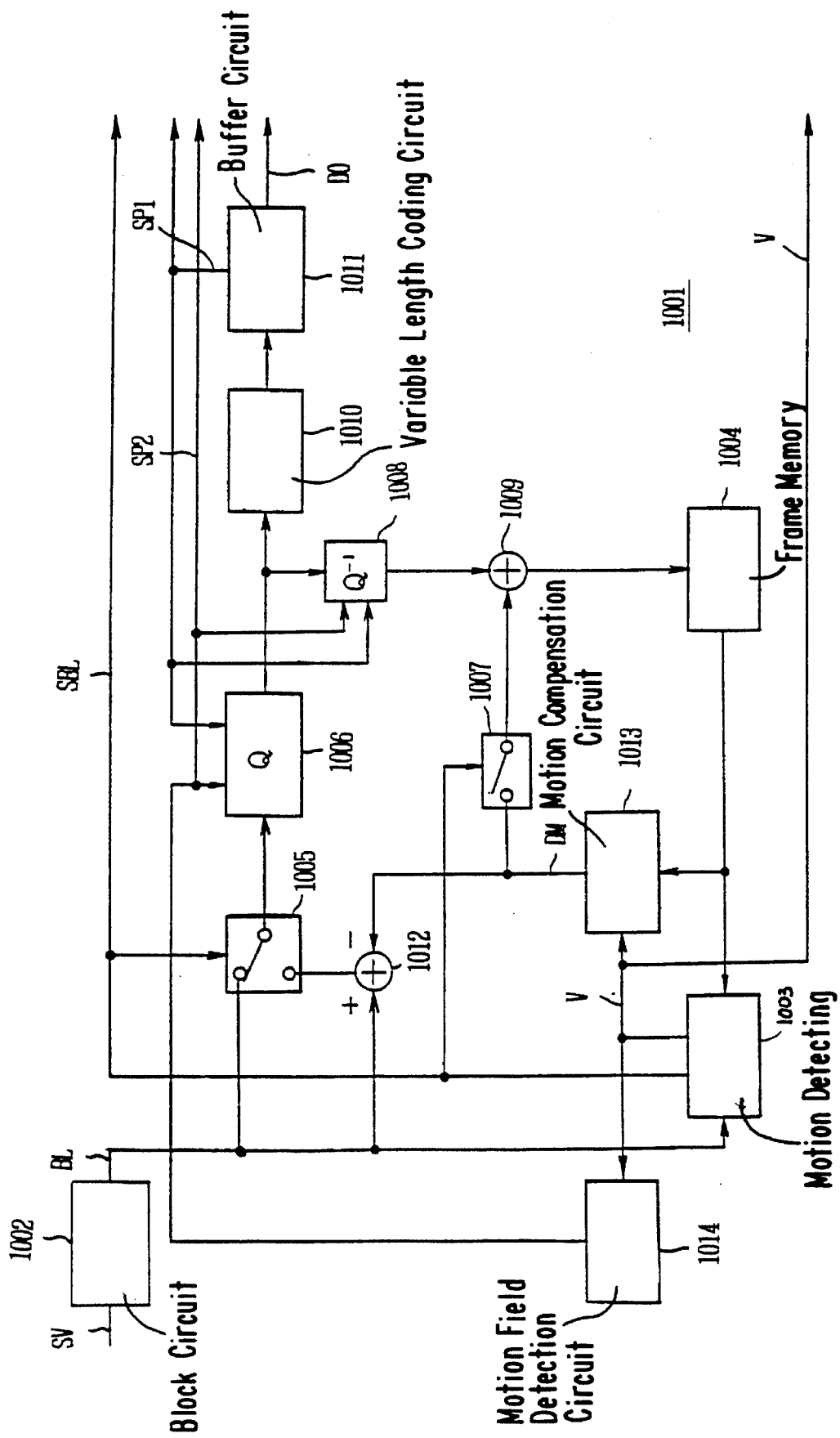
FIG. 10 is a block diagram showing an embodiment of a picture conversion apparatus.

(4) An Embodiment of The Picture Conversion Apparatus (4-1) General Construction In FIG. 10, 1001 generally designates a picture conversion apparatus which performs data compression for a successively input video signal, and then transmits the compressed video signal.

Figure 11:
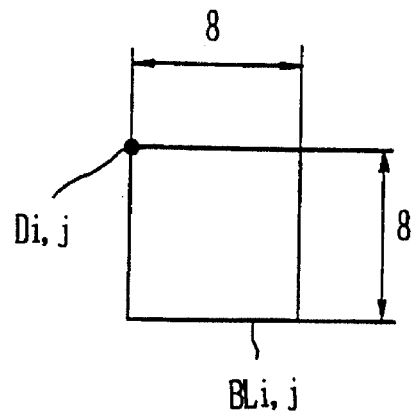
FIG. 11 is a schematic diagram illustrating a block of picture data, in the embodiment of the picture conversion apparatus.

More specifically, in the picture conversion apparatus 1001, after a video signal is converted into a digital signal, this digital video signal is divided into predetermined unit blocks BL each of which has 8× 8 pixels as shown in FIG. 11.

Furthermore, in the picture conversion apparatus 1001, these blocks BL are successively applied to a motion detection circuit 1003, by which a motion vector V is detected for each block BL using the block matching method.

That is, in the picture conversion apparatus 1001, one-frame-previous video data is stored in a frame memory 1004.

Figure 12:
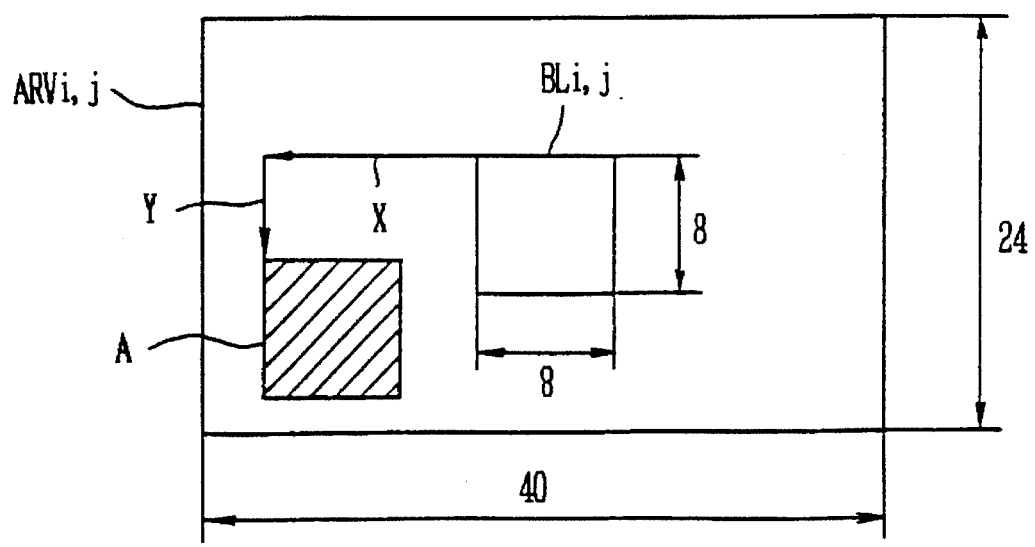
FIG. 12 is a schematic diagram illustrating a motion vector detection region, in the embodiment of the picture conversion apparatus.

As shown in FIG. 12, the frame memory 1004 sets a region consisting of 40×24 pixels around the block BL which is input to the motion detection circuit 1003 as a motion vector detection area ARV. Then, the frame memory 1004 successively outputs the video data for every block BL in the motion vector detection area ARV.

The motion detection circuit 1003 detects the difference between the video data of the block BL and the output data from the frame memory 1004 so as to obtain the difference data between the video data of the block BL and the one-frame-previous video data, and then furthermore determines the sum of the absolute values of these difference data.

In the above processing, in order to obtain the motion vector (in this case, the motion vector consists of the values −X and −Y with respect to the horizontal and vertical directions, respectively) the motion detection circuit 1003 successively moves the block BL within the motion vector detection area ARV so as to determine the position A at which the sum of the absolute values of the difference data is minimized.

At the same time, the motion detection circuit 1003 also detects the sum of the absolute values of the video data for each block BL. Then, based on the comparison result between the above sum of the absolute values and the detection result of the motion vector, the motion detection circuit 1003 outputs a selection signal SEL for selecting an intraframe coding processing or interframe coding processing.

Thus, in the picture conversion apparatus 1001, depending on the amount of data of each block BL, either the intraframe coding processing or the interframe coding processing is selected, and then the video signal of each block is transmitted. In this way, the video signal is transmitted efficiently.

That is, in the case where the direct transmission of the video data of each block BL requires a less amount of the data in transmission, the motion detection circuit 1003 selects the intraframe coding processing.

In this case, the motion detection circuit 1003 switches the connection of a selection circuit 1005 so as to output the video signal of each block BL directly to a re-quantization circuit 1006.

Furthermore, when the intraframe coding processing is selected, the motion detection circuit 1003 turns off a switching circuit 1007 so that the output data of the inverse re-quantization circuit 1008 is directly stored into the frame memory 1004.

After performing the discrete cosine transform for the output data from the selection circuit 1005, the re-quantization circuit 1006 re-quantizes the converted data, and then outputs the result of the re-quantization.

A variable length coding circuit (VLC) 1010 performs variable length coding for the output data from the re-quantization circuit 1006, then outputs the coded result to a buffer circuit 1011 so as to successively output the transmission data D0 at a predetermined transmission rate corresponding to the capacity of the transmission line.

In contrast, the inverse re-quantization circuit 1008 inputs the output data from the re-quantization circuit 1006, then performs the inverse processing to the processing performed by the re-quantization circuit 1006.

Thus, when the intraframe coding processing is selected, the inverse re-quantization circuit 1008 reproduces the input data given to the re-quantization circuit 1006, then stores the reproduced data into the frame memory 1004. In this way, one-frame-previous video signal is stored in the frame memory 1004.

On the other hand, in the case where motion compensation gives less than the amount of data required for transmission, the motion detection circuit 1003 selects the interframe coding processing.

In this case, the motion detection circuit 1003 switches the connection of the selection circuit 1005 so that instead of the video data of each block BL, the output data from a subtracter 1012 is applied to the re-quantization circuit 1006.

Furthermore, when the interframe coding processing is selected, the motion detection circuit 1003 turns on the switching circuit 1007 so that the output data of a motion compensation circuit 1013 is added to the output data of the inverse re-quantization circuit 1008, and then this resultant addition is stored in the frame memory 1004.

That is, based on the detection result of the motion vector V, the motion compensation circuit 1013 cuts an area containing 8×8 pixels (the area with hatched lines in FIG. 12) out of the motion vector detection area ARV, and then outputs the resultant video data DM of the cut area. Thus, the motion compensated video data is output.

The subtracter 1012 subtracts the motion compensated video data DM from the video data of each block BL, then outputs the motion compensated residual difference data to the selection circuit 1005.

In this way, in the picture conversion apparatus 1001, after the discrete cosine transform is carried out for the above residual difference data, the re-quantization is also carried-out, and then the result is transmitted.

As described above, in the picture conversion apparatus 1001, by switching the intraframe coding processing and the interframe coding processing, efficient transmission of the video data D0 is achieved using the adaptive coding method.

Furthermore, when the interframe coding processing is selected, the switching circuit 1007 is turned on so that the motion compensated video data DM is applied to the adder 1009.

The adder 1009 adds the output data of the inverse re-quantization circuit 1008 with the motion compensated video data DM, thus reproduces the output data of the subtracter 1012 and stores the result in the frame memory 1004.

In this processing, depending on the amount of the data stored in the buffer circuit, the buffer circuit 1011 outputs a switching signal SP1 to the requantization circuit 1006 so as to switch the quantization step size of the re-quantization processing.

In this way, in said picture conversion apparatus 1001, the video data D0 is always transmitted at a constant rate.

Furthermore, in the picture conversion apparatus 1001 of the present embodiment, a motion field detection circuit 1014 decides the characteristic feature of the picture of each block. Then, based on this decision, the quantization step size is switched so that the high quality video data can be transmitted efficiently by making effective use of human visual sensitivity.

Figure 13:
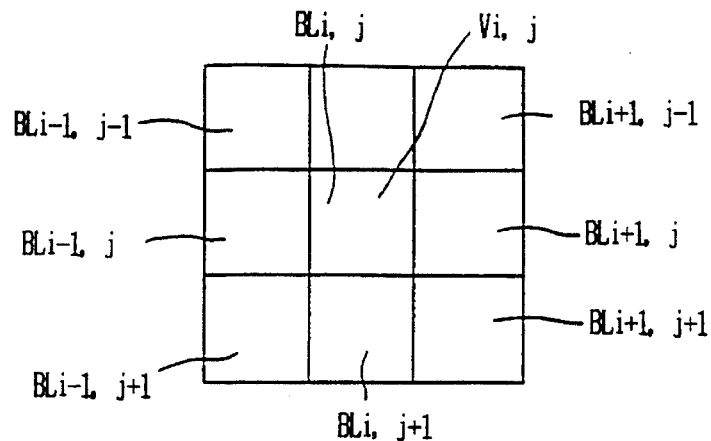
FIG. 13 is a schematic diagram illustrating description of motion field detection, in the embodiment of the picture conversion apparatus.

That is, as shown in FIG. 13, the motion field detection circuit 1014 successively inputs the detection result of the motion vector, and then, for each 3×3 blocks, performs the processing described by the following equation:

$$Ir = \sum_K |V_{i,j} \times VK| + \sum_L \frac{|V_{i,j} \times VL|}{\sqrt{2}} \tag{1}$$

Where vector $V_{i,j}$ represents a motion vector V in the block $BL_{i,j}$ corresponding to a block which is to be processed by the re-quantization circuit 1006.

Subscripts K and L are given by $$K = j-1, i1, j, i+1, j, i, j+1 \tag{2}$$

$$L = i-1, j-1, i+1, j-1, i-1, j+1, i+1, j+1 \tag{3}$$

Thus, for each block BL, the motion field detection circuit 1014 detects the degree of disorder Ir of the motion vector V between the block BL and surrounding eight blocks BL.

That is, the vector products are obtained for the motion vector among the surrounding blocks BL, and then the sum of the absolute values of these vector products is obtained. If the motion vectors V show good similarity in their directions and magnitudes, then a small detection result Ir is obtained.

Therefore, when the calculation described by equation (1) is carried out for the surrounding eight blocks BL, if there is good similarity in the direction and the magnitude of the vectors V among the surrounding eight blocks BL, then the motion field detection circuit 1014 gives a small detection result Ir.

Figure 14:
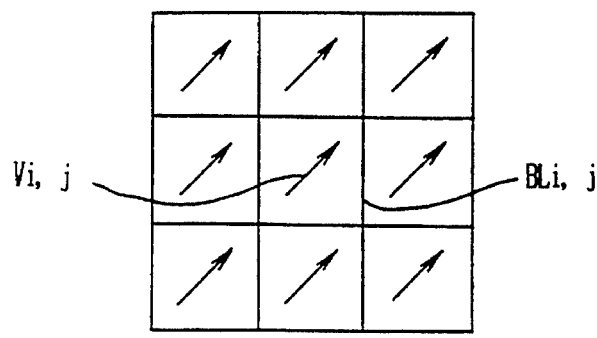
FIG. 14 is a schematic diagram illustrating a case when motion vectors are of small disorder.

That is, as shown in FIG. 14, in the case where the directions and magnitudes of the motion vectors are similar to each other among the surrounding blocks, it is possible to decide that the present block has an picture showing a motion similar to the motion in surrounding blocks. As a result, the small detection result Ir is contained.

Figure 15:
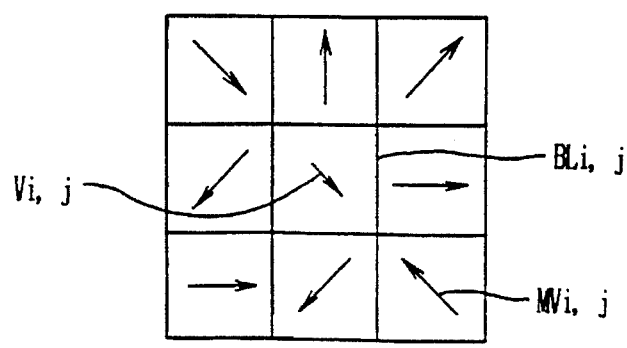
FIG. 15 is a schematic diagram illustrating a case when motion vectors are of large disorder.

On the other hand, when there is no similarity in the magnitude and direction of the motion vector V among the surrounding blocks as in FIG. 15, the present block can be considered to have an picture showing a motion different from those of surrounding blocks. Thus, the large detection result Ir is obtained.

In this way, the motion field detection circuit 1014 detects the degree of disorder compared to the surrounding blocks based on the detection result Ir. Thus, the characteristic feature of the picture in each block compared to the surrounding blocks can be detected.

That is, if there is a similarity in motion between a picture in the present block and other pictures in surrounding blocks, then it is possible to decide that the entire picture moves uniformly as a whole. On the other hand, if there is difference in motion between a picture in the present block and other pictures in surrounding blocks, it can be considered that the present block moves differently compared to other surrounding blocks.

In the case where the present block shows a different motion compared to the motion of other surrounding blocks, the present block has a characteristic feature that the degradation of the picture quality in the present block cannot be easily perceived.

Therefore, for the present area, the quantization step size is set to a large value, and then, as a result of this, a small quantization step size can be given for other areas. Thus, the degradation of the picture quality can be effectively avoided and efficient transmission of the video signal can be achieved.

Furthermore, in the process of detecting the degree of disorder Ir, the motion field detection circuit 1014 makes weighing in such a way that the vector products are weighed by the factor of $2^{-1/2}$ for the adjacent blocks existing apart in oblique directions to the right and the left. Thus, the detection of the degree of disorder is carried out taking into account the effect of the distance between the control block $BL_{i,j}$ and other blocks.

In this way, the degree of the disorder Ir is detected taking into account the distance from the central block $BL_{i,j}$, the detection of the disorder can become more realistic corresponding to the actual motion of the picture.

Therefore, if the quantization step size is switched based on the detection result of disorder, then higher efficiency can be achieved in transmission of a higher quality video signal by making more effective use of human visual sensitivity.

That is, the motion field detection circuit 1014 outputs the switching signal SP2 to the re-quantization circuit 1006 based on the detection result of the disorder Ir.

Figure 16:
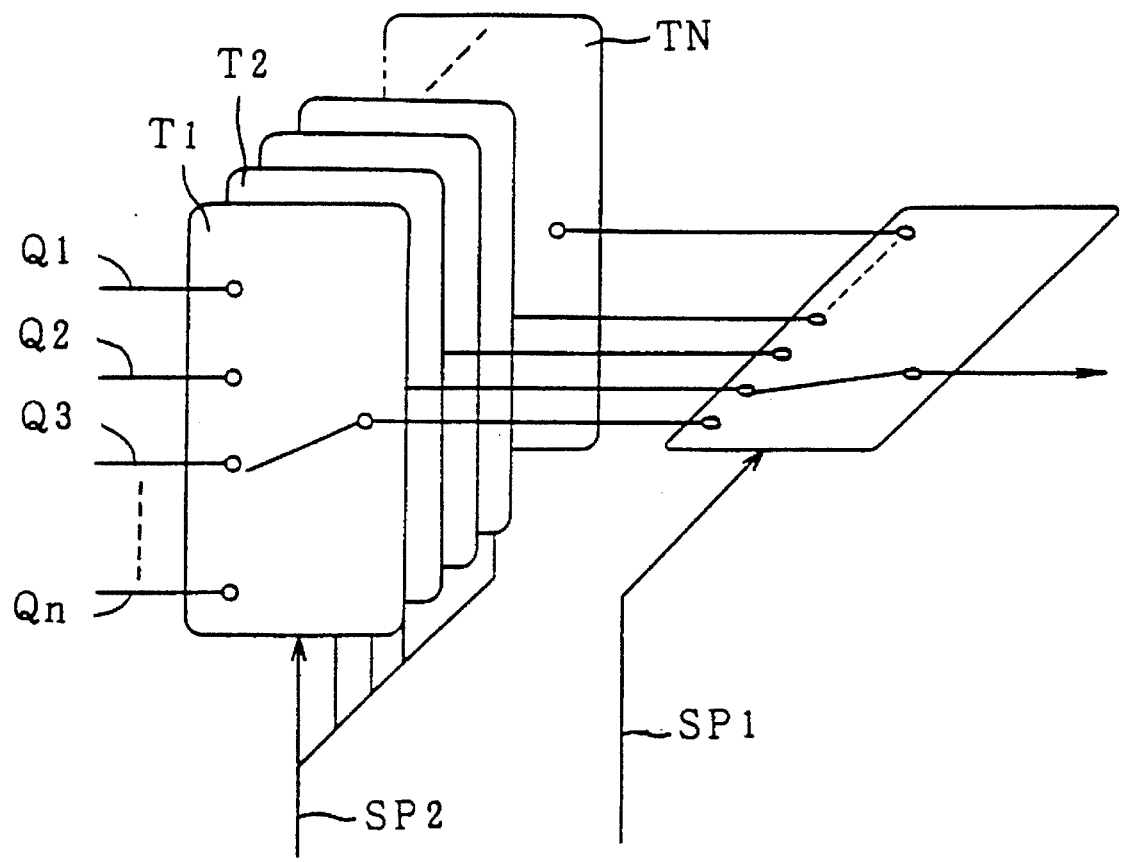
FIG. 16 is a schematic diagram illustrating description of switching a quantization step size, in the embodiment of picture conversion apparatus.

As shown in FIG. 16, by switching the table T1 to TN, the re-quantization circuit 1006 switches the quantization step size from $Q_1$ to $Q_n$ according to the switching signal SP1 and SP2 so that the quantization step size $Q_1$–$Q_n$ can be switched depending on the nature of a picture and on the amount of the data stored in the buffer memory 1011.

Figure 17:
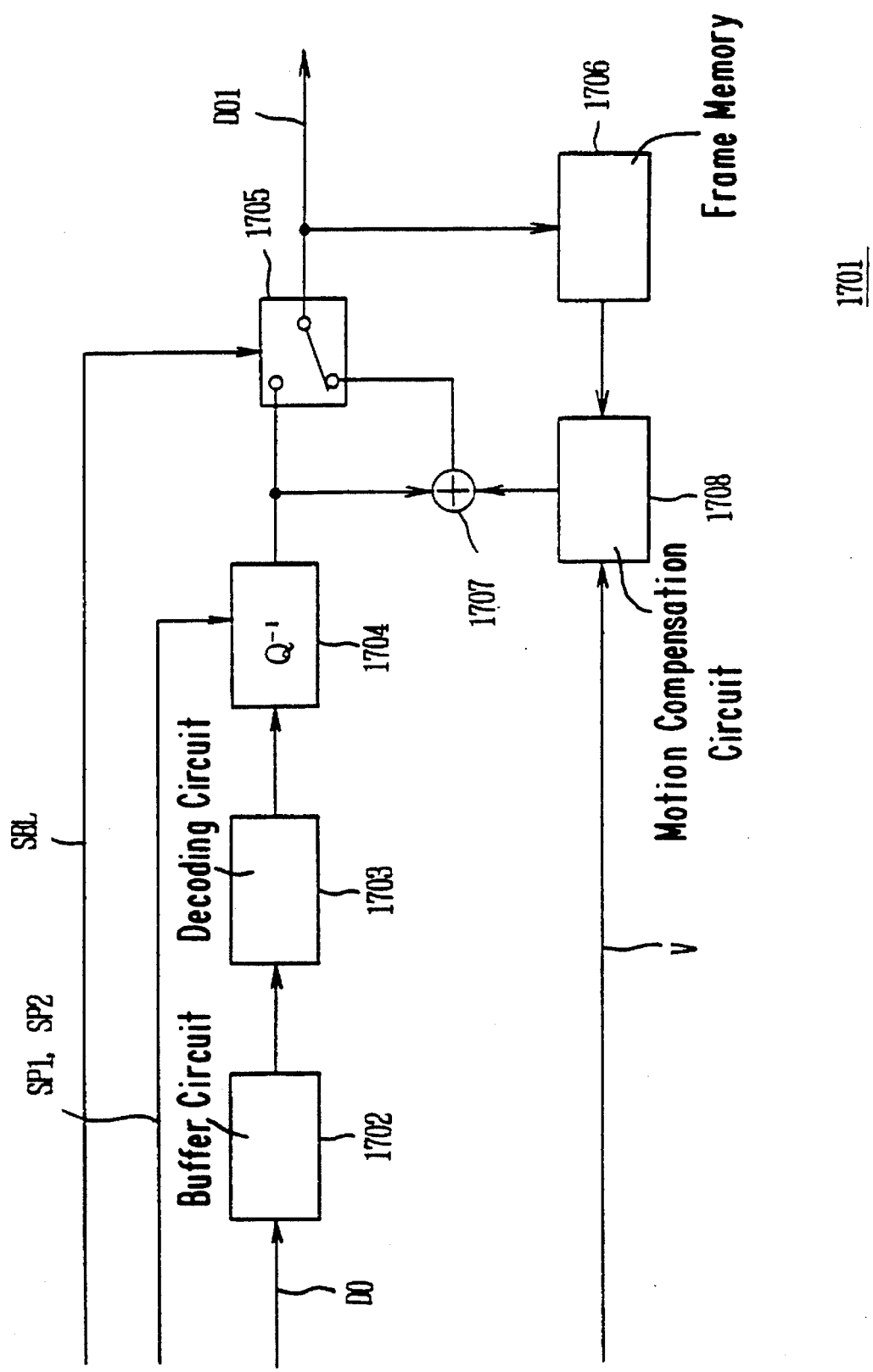
FIG. 17 is a block diagram showing a demodulation circuit, in the embodiment of the picture conversion apparatus.

As shown in FIG. 17, a demodulation circuit 1701 gives the transmission data D0 to a decoding circuit 1703 via the buffer memory 1702. The decoding circuit 1703 performs the inverse processing to the processing performed by the variable length coding circuit 1010 so as to reproduce the output data of the re-quantization circuit 1006.

An inverse re-quantization circuit 1704 performs the inverse processing to the processing performed by the re-quantization circuit 1006 according to the switching signal SP1 and SP2 transmitted together with the transmission data D0. Thus, the input data of the re-quantization circuit 1006 is reproduced.

A selection circuit 1705 switches the connection according to the selection signal SEL so that when the intraframe coding processing is selected, the output data of the inverse re-quantization circuit 1704 is directly output.

Thus, the demodulation circuit 1701 can reproduce the intraframe-coded video data D01.

A frame memory 1706 stores the output data of the selection circuit 1705. Thus, one-frame-previous video data is stored as in the picture conversion apparatus 1001.

On the other hand, when the interframe coding processing is selected, the selection circuit 1705 switches the connection so that the output data of an adder 1707 is selectively output.

The adder 1707 inputs the output data of the frame memory 1706 via a motion compensation circuit 1708, then adds the motion compensation video data with the video data coming from the transmission object. Then, the added result is output.

Thus, when the interframe coding processing is selected, the adder 1707 reproduces the input data of the adder 1012 so that the demodulation circuit 1701 reproduces the video signal transmitted via the selection circuit 1705.

(4-2) Operation of the Embodiment

In the above construction, the video signal is converted in a digital signal, and then applied to a motion detection circuit 1003 by a unit data of a block BL containing 8×8 pixels. Then, the motion detection circuit 1003 detects motion vector V using the block matching method.

This motion vector is applied to a motion compensation circuit 1013, by which the motion compensation is carried out for the one-frame-previous video data.

The motion compensated video data is applied to a subtracter 1012, by which the motion compensated video data is subtracted from the successively input video data to produce the residual difference data.

When the interframe coding processing is selected, a re-quantization circuit 1006 performs discrete cosine transform for the residual difference data, then re-quantizes the resultant converted data. The resultant quantized data is output.

On the other hand, when the intraframe coding processing is selected, the re-quantization circuit 1006 performs discrete cosine transform directly for the successively input video data instead of the residual difference data, and then re-quantizes and outputs it.

In the above processing, a motion field detection circuit 1014 detects the degree of disorder of the motion vector V so that the quantization step size is switched according to the above detection result SP2.

When there is no similarity in the direction and the magnitude between the motion vector V in the present block and those in the surrounding blocks, the quantization step size is set large. As a result of this, it becomes possible that the step size is set large. As a result of this, it becomes possible to set the quantization step size small for other areas.

In this way, the quantization step size is set large for the area where the degradation of the picture quality cannot be easily perceived. Thus, as a result of this, it becomes possible to set the quantization step size small for other areas. Hence, highly efficient transmission of high quality video signals can be achieved by making effective use of human visual sensitivity.

(4-3) Other Embodiments

In the above embodiment, the degree of disorder of the motion vector is detected within the area of 3×3 blocks.

However, the present invention is not limited to that. The area where the detection is carried out can be set to any size as required.

Furthermore, in the above embodiment, an area of 40×24 pixels is set as a motion vector detection area for a block of 8×8 pixels. However, the present invention is not limited to that. The size of the block and the size of the motion vector detection area can be freely set as required.

Furthermore, in the above embodiment, the interframe coding processing and intraframe coding processing is switched for one unit block. However, the present invention is not limited to that. For example, the interframe coding processing and the intraframe coding processing can be switched for one frame. Moreover, other similar modifications are also possible.

While there have been described several preferred embodiments of the present invention, it will be obvious to those skilled in the art that various changes and modifications can be made that fall within the true spirit and scope of the invention.

What is claimed is:

1. A target object following apparatus comprising:

imaging means having a focus and an iris, for picking up an image of an imaging area and supplying a video signal corresponding to data produced therefrom as picture data including a target object;

imaging area changing means for changing said imaging area of said imaging means on a basis of a predetermined control signal;

a picture data blocking circuit for dividing said picture data corresponding to said image of said imaging area which is sequentially input into blocks of a predetermined number of pixels in both a horizontal direction and a vertical direction, said picture data being supplied from said image means;

an input circuit for setting a position of an area containing said target object in said picture data according to an input by a user and supplying a position signal produced therefrom;

a detection area setting circuit for setting a tracking vector detection area including a predetermined number of said blocks in the horizontal and the vertical directions according to said position signal;

a motion detection circuit for detecting motion vectors for respective ones of said blocks in said tracking vector detection area and supplying the detected motion vectors produced therefrom;

a tracking vector detection circuit for detecting a distribution of said detected motion vectors of said respective ones of said blocks in said tracking vector detection area and then detecting a tracking vector with a moving direction and a moving quantity of a portion of a picture in said tracking vector detection area on a basis of said distribution detection result;

a detection area correction circuit for moving said tracking vector detection area in correlation with a motion of said target object in said picture data, said tracking vector detection area being moved on a basis of said tracking vector with said moving direction and said moving quantity detected by said tracking vector detection circuit;

a window-frame data generation circuit for generating window-frame picture data of a window frame corresponding to said tracking vector detection area, and for supplying said predetermined control signal to said imaging area changing means;

a picture composing circuit for superimposing said window frame represented by said window-frame picture data upon said video signal, and generating a composite video signal therefrom;

display means for receiving said composite signal, and displaying a picture with said window frame superimposed; and control means for detecting a signal level of said video signal for said tracking vector detection area, and for supplying a second predetermined control signal to said imaging means and thereby controlling said focus and said iris of said image means on a basis of said detected signal level of said video signal.

2. The target object following apparatus according to claim 1, wherein said motion detection circuit includes means for computing said plurality of motion vectors by performing a block matching method.

3. The target object following apparatus according to claim 1 or 2 further comprising:

a second motion detection circuit for detecting a plurality of motion vectors of respective ones of a plurality of blocks forming said picture data;

a picture data processing circuit for motion compensating said plurality of blocks forming picture data on the basis of said plurality of motion vectors and outputting residual data produced herefrom;

a motion field detection circuit for detecting a disorder of each one of said plurality of motion vectors for a respective one of said plurality of blocks relative to motion vectors of respective surrounding blocks adjacent to said respective one of said plurality of blocks and producing an indication of said detected disorder;

a quantizing circuit receiving said indication of said detected disorder and for quantizing said residual data and outputting quantized data produced therefrom; and a buffer circuit for storing said quantized data and outputting said stored quantized data as transmission data, wherein said quantizing circuit changes a quantizing step size greatly when said indication of said detected disorder of said one of said plurality of motion vectors for said respective one of said plurality of blocks is high.

4. A target object following apparatus comprising:

a spatial edge detection circuit for outputting a spatial edge detection result for a motion picture comprising a plurality of sequentially input frames;

a time edge detection circuit for outputting a time edge detection result for said motion picture; and an edge judging means for outputting a motion edge detection result, on a basis of said spatial edge detection result and said time edge detection result;

wherein said spatial edge detection circuit comprises a spatial power detection circuit for outputting a spatial power detection result detecting powers of high frequency components for a plurality of predetermined blocks of said frames; and a first comparison circuit for obtaining a first comparison result comparing said spatial power detection result with a first comparison reference, and for outputting said spatial edge detection result when said spatial power detection result is larger than said first comparison reference; and wherein said time edge detection circuit comprises a time power detection circuit for obtaining a difference data between a present frame and a previous frame of said motion picture, and for detecting a power of said difference data to output a time power detection result for each of said predetermined blocks; and a second comparison circuit for obtaining a second comparison result comparing said time power detection result with a second comparison reference, and then, when said time power detection result is larger than said second comparison reference, for outputting said time edge detection result;

wherein said edge judging means judges an edge as having a motion when both of said spatial edge detection result and said time edge detection result are obtained, and then for outputting said motion edge detection result.

5. The target object following apparatus according to claim 4, further comprising:

a picture data blocking circuit for dividing said sequentially input frames into said plurality of predetermined blocks and another plurality of predetermined blocks of a predetermined number of pixels in a horizontal direction and a vertical direction;

a detection area setting circuit for setting a tracking vector detection area including a predetermined number of said another plurality of predetermined blocks in the horizontal and the vertical directions;

a motion detection circuit for detecting a motion vector for respective ones of said predetermined number of said another plurality of predetermined blocks within said tracking vector detection area; and a tracking vector detection circuit for detecting a distribution of said motion vectors within said tracking vector detection area on the basis of the detection results of said spatial edge detection circuit in said target object following apparatus, and then detecting a moving direction and a moving quantity of said picture within said tracking vector detection area on the basis of said distribution detection result.

6. The target object following apparatus according to claim 5, further comprising:

an imaging means for imaging the target object, and for outputting said plurality of sequentially input frames into said target object following apparatus;

an imaging area changing means for changing an imaging area of said imaging means on the basis of a predetermined control signal; and a detection area correction circuit for tracking the movement of said picture within said tracking vector detection area on the basis of the detection result of said tracking vector detection circuit within said target object following apparatus.

7. The target object following apparatus according to claim 5 or 6, wherein said motion detection circuit includes means for computing said plurality of motion vectors by performing a block matching method.

8. The target object following apparatus according to claim 4, 5 or 6 further comprising:

a second motion detection circuit for detecting a plurality of motion vectors of respective ones of a plurality of blocks forming one of said sequentially input frames;

a picture data processing circuit for motion compensating said plurality of blocks forming said one of said sequentially input frames on the basis of said respective plurality of motion vectors and outputting residual data produced therefrom;

a motion field detection circuit for detecting a disorder of each one of said plurality of motion vectors for a respective one of said plurality of blocks relative to motion vectors of respective surrounding blocks adjacent to said respective one of said plurality of blocks and providing an indication of said detected disorder;

a quantizing circuit responsive to said indication of said detected disorder and for quantizing said residual data and outputting quantized data produced therefrom; and a buffer circuit for storing said quantized data and outputting said stored quantized data as transmission data, wherein said quantizing circuit changes a quantizing step size greatly when said indication of said detected disorder of said one of said plurality of motion vectors for said respective one of said plurality of blocks is high.

9. The target object following apparatus according to claim 1 or 4, wherein said tracking vector detection circuit stores into tables said detected motion vectors of said respective ones of said blocks in said tracking vector detection area, said detected motion vectors having respective moving directions and moving quantities, and determines said tracking vector with said moving direction and said moving quantity using a vector having a largest count in said distribution of said detected motion vectors of said respective ones of said blocks in said tracking vector detection area stored in said tables.

10. A picture conversion apparatus comprising:

a motion detection circuit for detecting a plurality of motion vectors for a plurality of respective blocks forming picture data, for calculating a sum of absolute values for each block of picture data, and for generating a selection signal for the block of picture data according to a comparison of said corresponding sum of absolute values and corresponding motion vector of the block of picture data;

a picture data processing circuit for motion compensating said plurality of blocks forming picture data on the basis of said plurality of motion vectors and outputting residual data produced therefrom for each motion vector;

a selection circuit for switching between each block of picture data and said corresponding residual data for the block according to said selection signal and supplying a pre-quantized video signal therefrom;

a motion field detection circuit for detecting a disorder of each one of said plurality of motion vectors relative to motion vectors of respective surrounding blocks adjacent to a block corresponding to the motion vector for which said disorder is detected, and producing an indication of said detected disorder;

a quantizing circuit receiving said indication of said detected disorder and for quantizing said pre-quantized video signal and outputting quantized data produced therefrom, said quantizing circuit changing a quantizing step size according to said indication of said detected disorder of the motion vector; and a buffer circuit for storing said quantized data and outputting said stored quantized data as transmission data.

11. The picture conversion apparatus according to claim 10, wherein said motion field detection circuit calculates said disorder of the motion vector by executing an outer-product of the motion vector and each one of said motion vectors of said respective adjacent surrounding blocks, and then executing an absolute summation of outer-product results corresponding to said respective adjacent surrounding blocks, wherein the motion vector has a magnitude of A and the one of said motion vectors of said respective adjacent surrounding blocks has a magnitude of B, and the magnitude of the outer product equals A times B times a sine of an angle between the motion vector and said one of said motion vectors of said respective adjacent surrounding blocks.

* * * * *

UNITED STATES PATENT AND TRADEMARK OFFICE
CERTIFICATE OF CORRECTION

PATENT NO.   : 5,552,823
DATED        : September 03, 1996
INVENTOR(S)  : Koji Kageyama It is certified that error appears in the above-identified patent and that said Letters Patent is hereby corrected as shown below:

Col. 2, line 8, delete "of" first occurrence
     line 34, change "into" to --in--
Col.3, line 25, after "invention," insert --it--
Col.4, line 43, delete "thus"
     line 48, change "displays" to --displayed--
     line 57, after "device" delete "-"
Col.6, line 3, change "(207)" to --207--
Col.8, line 11, after "tracking" insert -- - --
Col. 14, line 22, change "requantization" to --re-quantization--
     line 31, delete "the"
     line 46, change "K=j-1,i1," to --K=i, j-1, i-1,--

Col. 18, line 26, change "herefrom" to --therefrom--
Col.20, line 16, change "4" to --5--

Signed and Sealed this

First Day of September, 1998

Attest:

BRUCE LEHMAN

Attesting Officer

Commissioner of Patents and Trademarks